United States Patent [19]
Brusch

[11] 3,864,816
[45] Feb. 11, 1975

[54] CYLINDRICAL STOCK MACHINING APPARATUS

[76] Inventor: Paul C. Brusch, 342 W. Ridge Pike, Limerick, Pa. 19468

[22] Filed: Apr. 1, 1974

[21] Appl. No.: 456,978

[52] U.S. Cl.................... 29/563, 29/35.5, 29/38 R, 29/564, 90/15 R, 90/21
[51] Int. Cl.......................... B23q 7/00, B23p 23/00
[58] Field of Search ....... 29/33 R, 33 J, 33 P, 33 Q, 29/33 S, 33 T, 563, 564, 35.5, 38 R, 37 R; 90/15 R, 21

[56] References Cited
UNITED STATES PATENTS

| | | | |
|---|---|---|---|
| 2,215,369 | 9/1940 | Gabriel | 90/15 R X |
| 3,283,391 | 11/1966 | Thompson et al. | 29/37 R |
| 3,577,829 | 5/1971 | Hurn et al. | 90/21 R |

*Primary Examiner*—Gil Weidenfeld
*Attorney, Agent, or Firm*—Edelson and Udell

[57] ABSTRACT

Apparatus consisting of a feeding section and a sizing and machining section for cutting to size and then machining elongated cylindrical objects such as tubing, piping and bar stock. The feeding section accepts a long standard length of stock and feeds it into the sizing and machining section where the long length is first sized to the pre-selected desired length, cut to size, and the cut piece then has machining operations carried out upon its opposite ends whereupon it is discharged into a collection bin. The piece is sequentially moved from the cutting station to the machining station to the discharging station by means of a turret mechanism. The sizing, cutting, machining and discharging functions are carried out automatically in a timed sequence which is co-ordinated with the feeding function by means of control equipment utilizing electric, pneumatic and hydraulic control elements. Means are provided for manual operation of each function of the apparatus.

28 Claims, 27 Drawing Figures

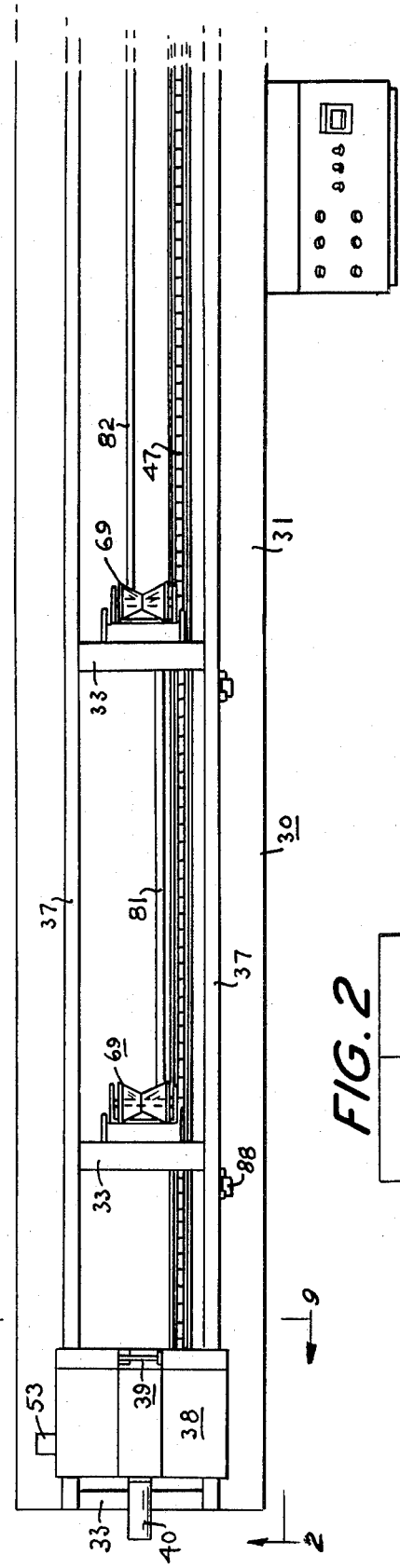
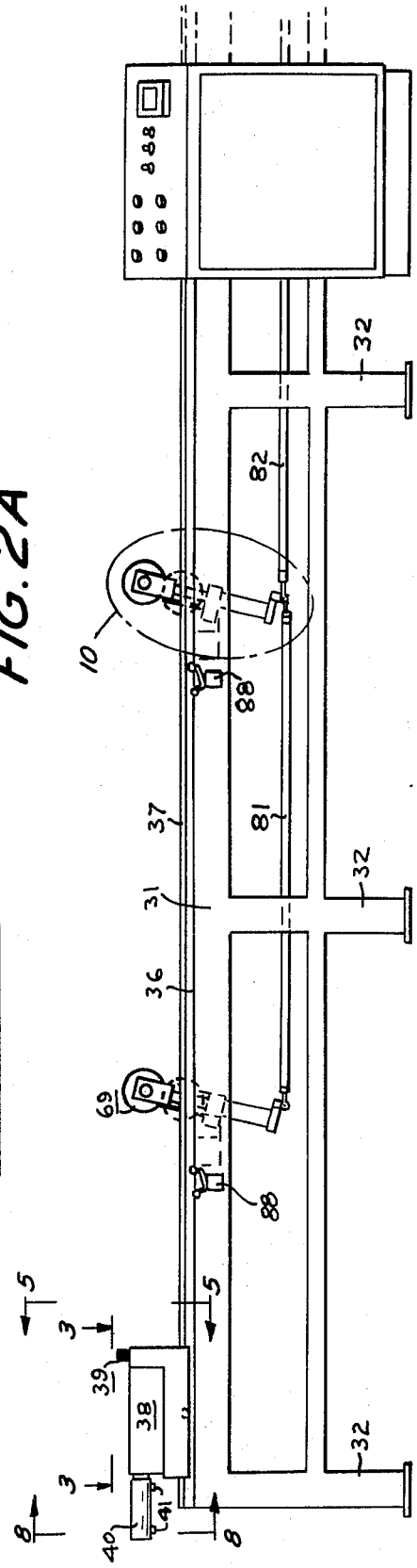

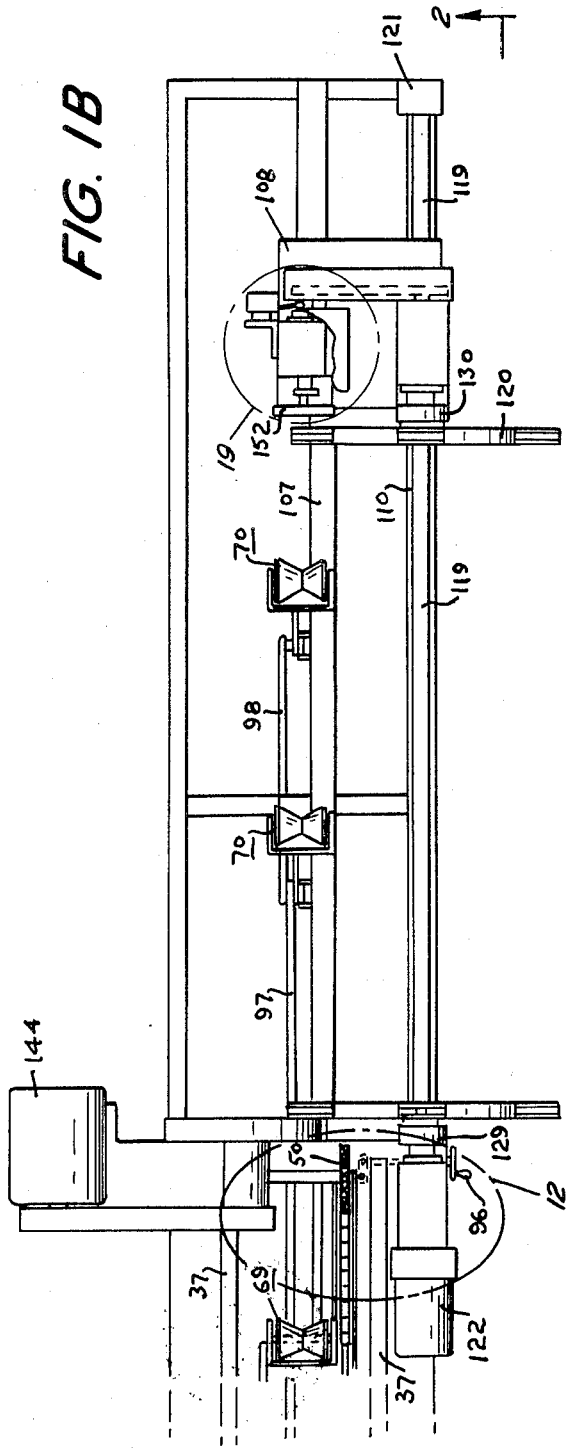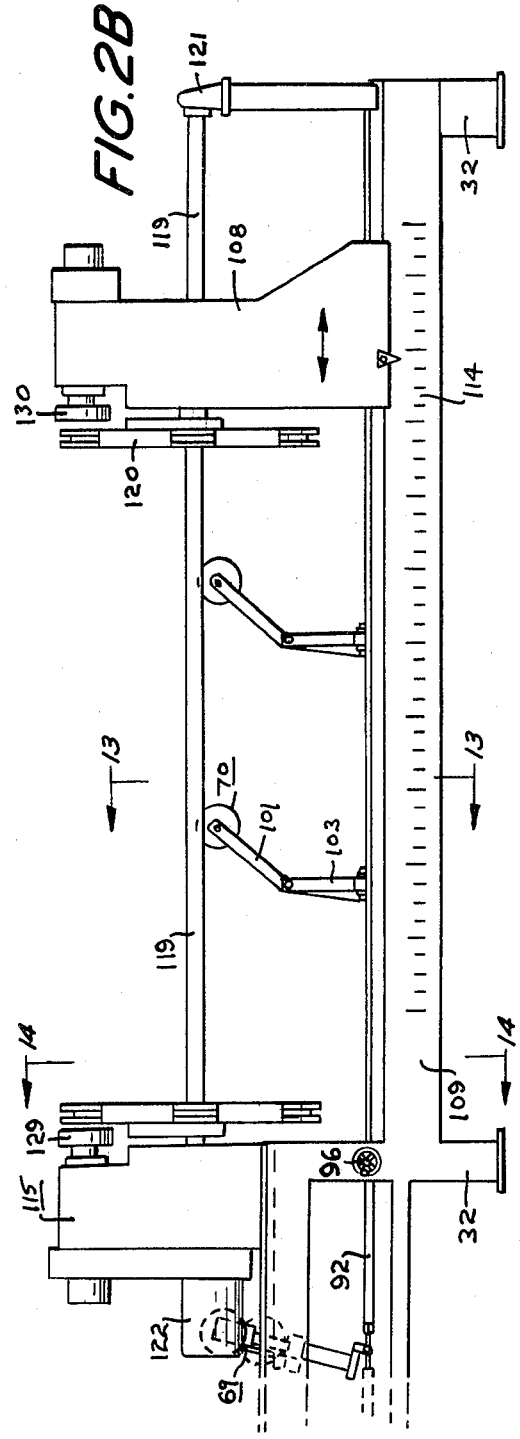

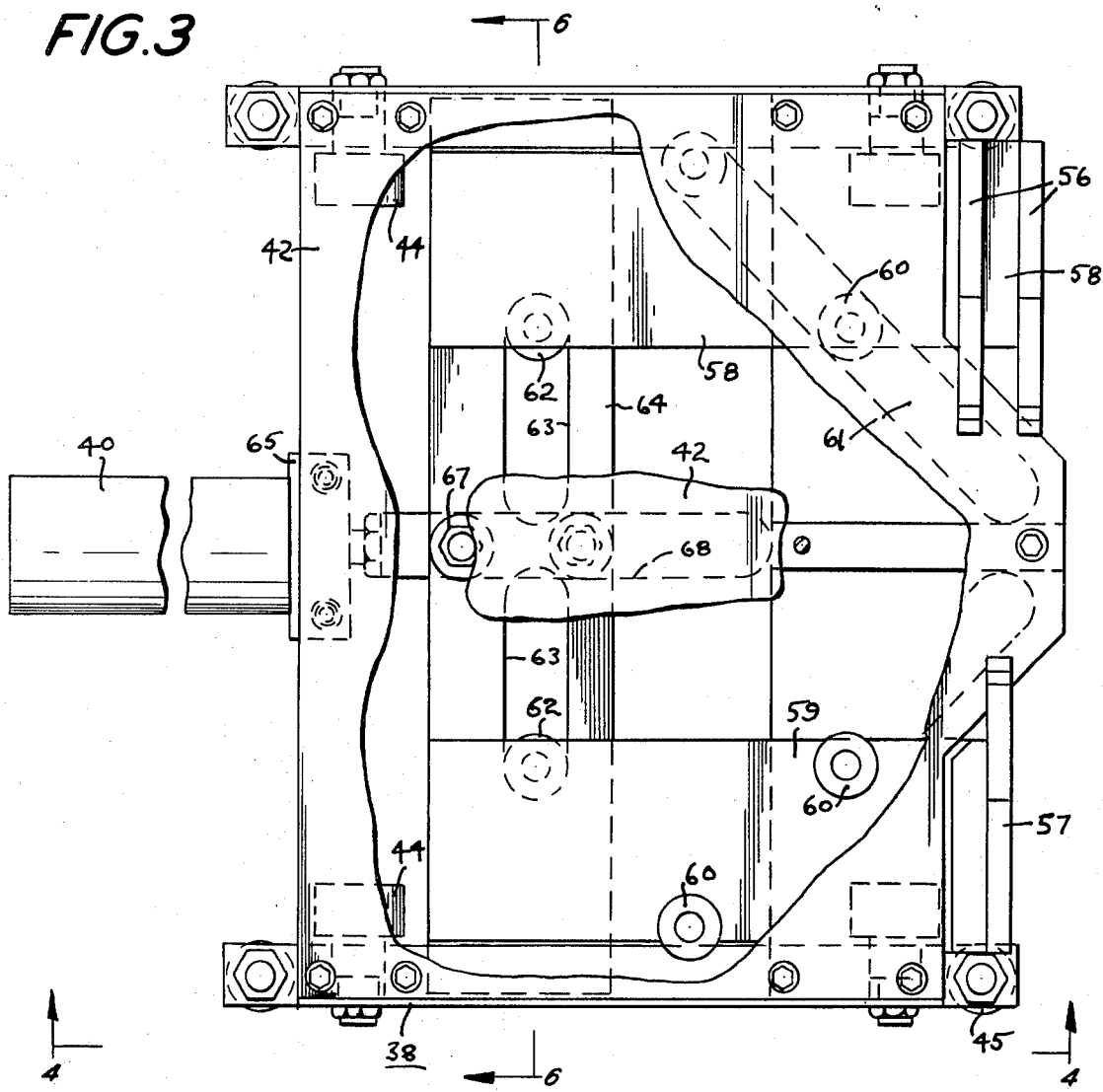
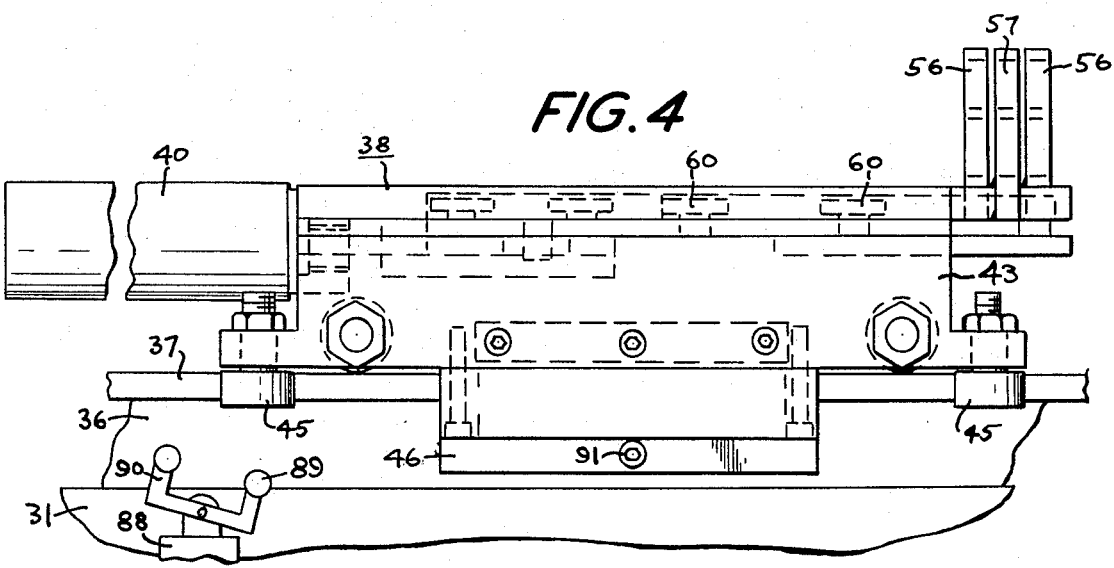

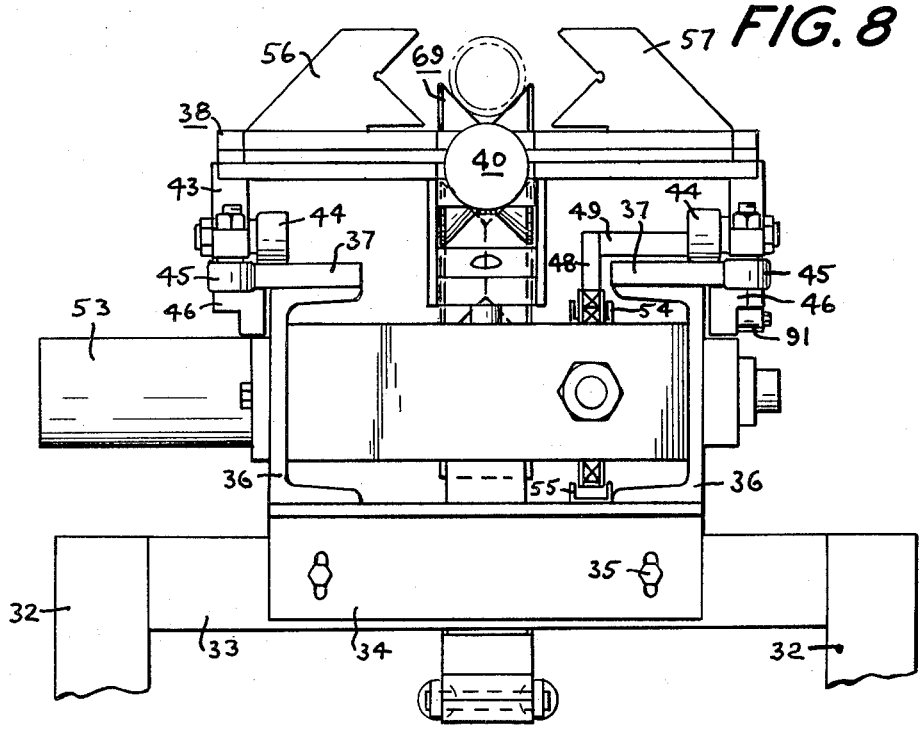
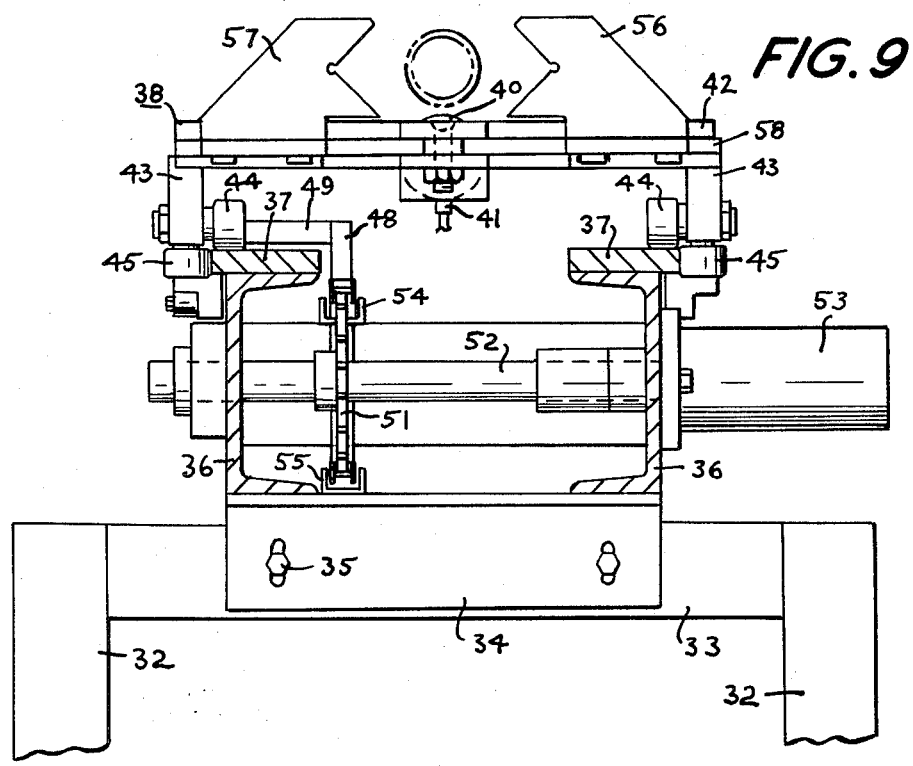

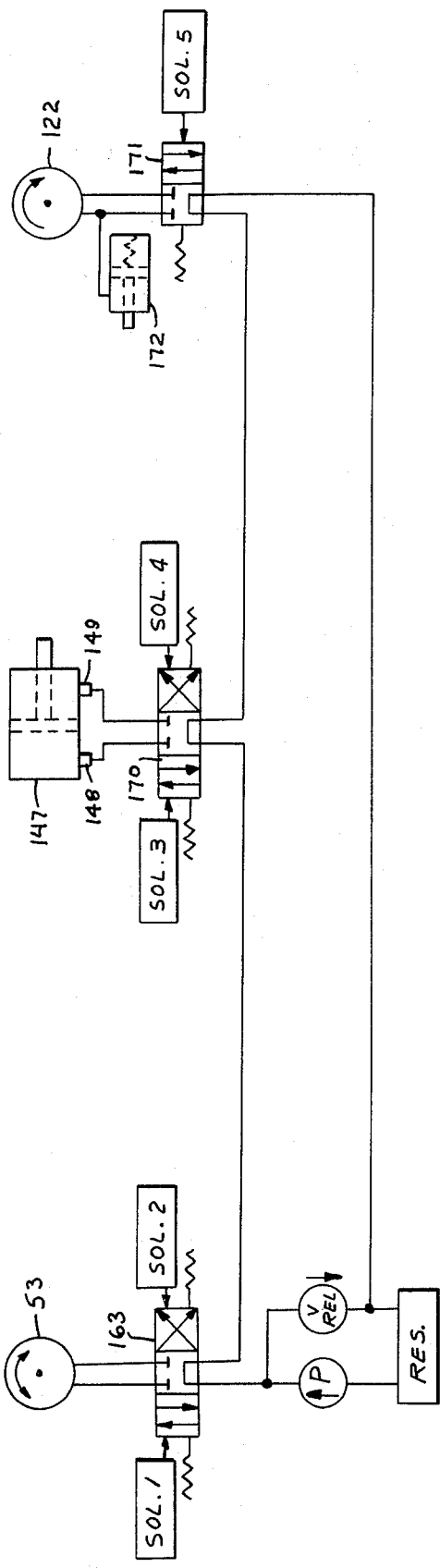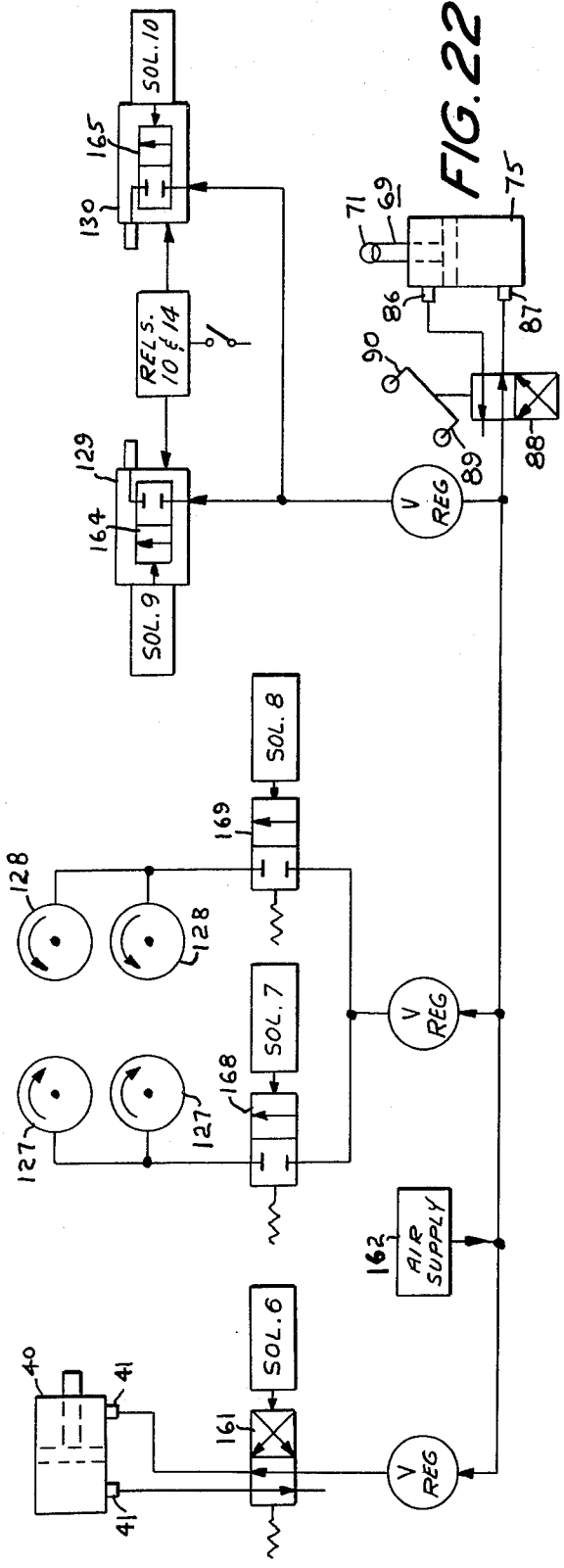

CYLINDRICAL STOCK MACHINING APPARATUS

This invention relates generally to apparatus for cutting and machining elongated cylindrical objects such as tubing, piping and bar stock. More particularly, the invention relates to apparatus for taking stock lengths of such cylindrical stock, as for example standard twenty foot lengths, automatically successively cutting off pre-selected shorter lengths from the long stock piece and thereafter carrying out machining operations on either one or both ends of the pre-selected cut length, and then discharging the finished piece from the apparatus into a collection bin.

The apparatus according to the invention consists basically of two sections, one section being a feeding section which accepts the long standard length of stock and feeds it into the machining section where it is first cut to the pre-selected desired length and then has the machining operations carried out upon the opposite ends by being moved from the cutting station to the machining station by means of a turret mechanism. The sizing, cutting, machining and discharging functions are all carried out in a timed sequence which is also coordinated with the feeding function by means of control equipment utilizing electric, pneumatic and hydraulic control elements.

A primary object of the invention is to provide novel apparatus for automatically handling long lengths of cylindrical material to provide the sequential functions of automatically feeding a pre-selected length of stock in to a device which cuts the stock to the pre-selected length, thereafter moving the pre-selected cut-off piece to a machining apparatus and carrying out machining operations at either or both ends of the cut-off piece, then moving the finished piece to a discharge station and discharging it from the apparatus.

Another object of the invention is to provide a novel apparatus as aforesaid in which the functions of the apparatus are interrelated with one another and sequentially controlled by control mechanisms so that the initial long length of cylindrical material is automatically sequenced through the operations performed by the apparatus to thereby produce a plurality of finished parts from the initial standard length of cylindrical material.

A further object of the invention is to provide an apparatus as aforesaid wherein the machining section of the apparatus includes means for selecting the length of the finished part to be produced and a wide variety of machining operations to be carried out on the part such as threading, broaching, reaming, facing, deburring and the like.

The foregoing and other objects of the invention will become clear from a reading of the following specification in conjunction with an examination of the appended drawings wherein:

FIG. 1 is a plan view of the apparatus according to the invention, consisting of FIGS. 1A and 1B placed end to end as diagrammatically shown;

FIG. 2 is a side elevational view of the apparatus according to the invention, consisting of FIGS. 2A and 2B placed end to end as diagrammatically shown, and which is shown in FIG. 1, as would be seen when viewed along the line 2—2 of FIG. 1;

FIG. 3 is a plan view of the feed carriage of the apparatus as would be seen when viewed along the lines 3—3 of FIG. 2, the carriage being shown on an enlarged scale and with certain portions broken away to reveal details of the underlying mechanism;

FIG. 4 is a side view of the feed carriage mechanism shown in FIG. 3 as would be seen when viewed along the line 4—4 of FIG. 3;

FIG. 8 is a rear elevation of the feed carriage as would be seen when viewed along the line 8—8 on FIG. 2;

FIG. 9 is a cross section through the support table of the apparatus to provide a front elevational view looking into the front end of the feed carriage at a point also showing the feed carriage chain drive motor system as would be seen when viewed along the line 9—9 of FIG. 1;

FIG. 22 is a schematic diagram of the pneumatic control system incorporated in the invention; and FIG. 23 is a schematic diagram of the hydraulic control system incorporated in the invention.

In the several figures, like elements are denoted by like reference characters.

Figure 5:
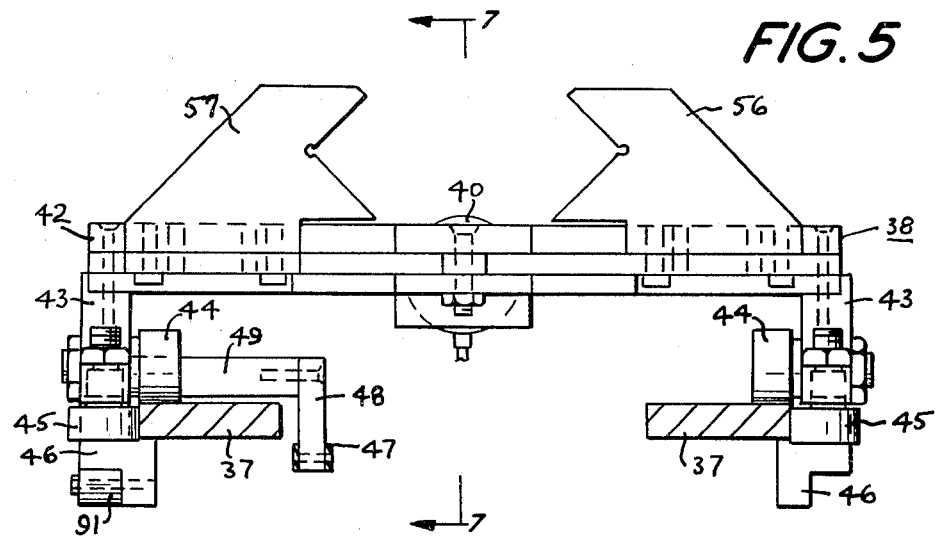
FIG. 5 is a front view of the feed carriage of the apparatus as would be seen when viewed along the line 5—5 of FIG. 2.

A more complete understanding of the invention will be had by first stating the sequence of operations to be carried out, then describing the mechanical apparatus illustrated for carrying out the functions, and finally by describing the control system utilized to perform the functions described. The functions carried out by the apparatus may be divided sequentially as follows:

1. Stock Insertion
2. Stock Feeding
3. Stock Stopping and Clamping
4. Work Piece Cutting
5. Work Piece Rotating
6. Work Piece Machining and Releasing
7. Feed Carriage End of Travel, and Feed Carriage Return and Scrap Discharge Before describing the functional sections of the apparatus, the general mechanical structure and layout will be first now considered.

GENERAL MECHANICAL

Referring first to FIGS. 1 and 2, there is seen an elongated table designated generally as 30 having horizonaally longitudinally extending upper supports designated as 31, vertically extending legs 32 and horizontal tube supports 33 extending between and rigidly interconnecting the longitudinal supports 31. As best seen in FIGS. 8 and 9, angle plates 34 are secured to the transverse supports 33 by means of bolts 35. Seated upon and rigidly secured to the horizontally extending channel members upper side walls are a pair of flat rectangular cross-section trackways 37 upon which the feed carriage designated generally as 38 rides from the extreme left end of the table 30 over toward the right to the machining section.

As will be subsequently discussed, the feed carriage 38 is provided with a set of clamping jaws generally designated as 39 which are opened and closed by a pneumatic jaw actuating cylinder 40 as shown at the rear end of the feed carriage 38. The jaw cylinder 40 is a double acting cylinder controlled by pneumatic lines through the cylinder ports 41 best seen in FIGS. 2 and 7.

As best seen in FIGS. 3 through 9, the carriage 38 is basically formed from the top plate 42 secured to and supported by a pair of side plates 43 to which are suitably secured by nuts and bolts a plurality of load bearing rollers 44 which are seated upon and ride along the trackways 37, and a plurality of carriage guide rollers 45 which roll in a horizontal plane along the outside edges of the carriage trackways 37. Also secured to and extending downward from the carriage side plates 43 are hold-down blocks 46 each of which has a portion which extends inward in underlying relationship to the outer edges of the feed carriage trackways 37 to prevent any upward movement of the carriage which would cause the carriage to leave the trackways.

The carriage 38 is connected to a drive chain 47 by means of a chain tie block 48 which is secured to one of the carriage side plates 43 by a plate 49. The drive chain 47, as best seen in FIG. 1 is trained about a sprocket 50 at the machining section end of the apparatus, and is also trained about a sprocket 51 best seen in FIG. 9 which is located at the left hand end of the table 30 mounted upon a sprocket shaft 52 extending between and journalled in the channel members 36. The sprocket shaft 52 is connected to and driven by a hydraulic chain drive motor 53 seen in FIGS. 1, 8 and 9. As also best seen in FIGS. 8 and 9, the upper and lower runs of the drive chain 47 are respectively supported by a chain supporting upper channel 54 and a lower channel 55.

The jaw mechanism 39 of the feed carriage 38 is adjustable to hold cylindrical stock covering a wide diametrical range. This is accomplished by providing opposing V-shaped jaw structures which move toward and interfit with one another to clamp about opposite side surfaces of the cylindrical material while maintaining the longitudinal cylindrical center at a constant elevation. As best seen in the showings of FIGS. 3 through 7, the clamping jaw structure 39 is composed of one double jaw having a pair of spaced apart jaw plates 56, and a single jaw composed of a jaw plate 57 of appropriate thickness and properly positioned to be movable horizontally into the space between the jaw pates 56 of the double jaw. The double jaw 56 is secured at its bottom end to a rectangular plate 58, and the single jaw 57 is secured at its lower end to a rectangular plate 59, both of which plates are most clearly seen in the showings of FIGS. 3, 6 and 7 disposed in immediately underlying relationship to the top plate 42.

Figure 7:
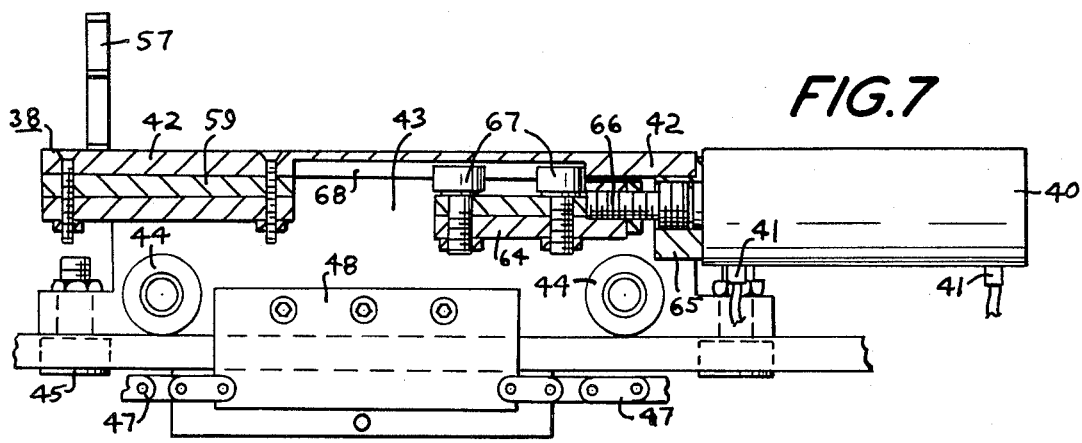
FIG. 7 is a longitudinal vertical central section through the feed carriage of the apparatus as would be seen when viewed along the line 7—7 of FIG. 5.
Figure 6:
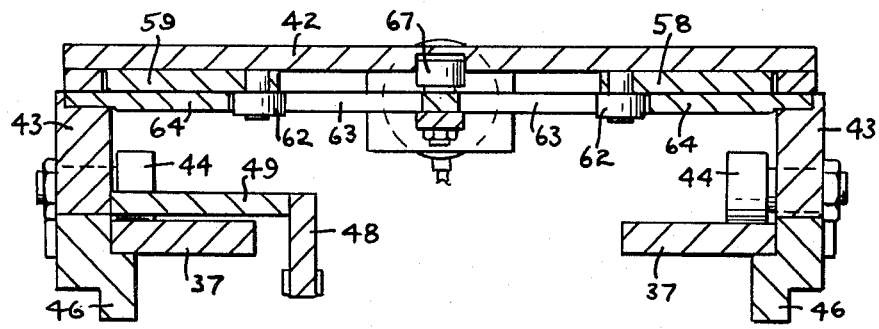
FIG. 6 is a vertical cross sectional view through the feed carriage as would be seen when viewed along the line 6—6 of FIG. 3.

Each of the jaw carrying plates 58 and 59 has affixed to its upper surface a pair of rollers 60 disposed and ridable within elongated slots formed in the undersurface of the top plate 42. Each of the jaw plates 58 and 59 is also provided proximate to its inner edge close to the rear end thereof with a roller 62 depending from the underside thereof and disposed within an elongated slot 63 formed in a plate 64 extending transversely across the feed carriage 38 and shiftable fore and aft with respect to the latter. As best seen in FIG. 7, the pneumatic jaw cylinder 40 is fixedly secured to the rear edge of the carriage top plate 42 by means of block 65 while the cylinder piston is fixedly connected to the plate 64 by the threaded piston end 66. Secured to and upstanding from the transverse plate 64 are a pair of rollers 67 also disposed for fore and aft longitudinal movement in a horizontal plane within a slot 68 formed in the under surface of the top plate 42.

The clamping jaw system 39 is operated by the jaw cylinder 40 in the following manner. As shown in FIG. 3, the jaws 57 and 58 are open and are at opposite sides of the feed carriage 38. When it is desired to move the jaws toward one another in order to clamp therebetween the end of the cylindrical part to be fed into the machine, the cylinder 40 is pressurized through one port to cause the piston to move outward from the cylinder and thereby shift the plate 64 forward toward the front of the feed carriage. As the plate 64 moves forward with the rollers 67 moving centrally forward in the top plate slot 68, the jaw plates 58 and 59 are also shifted forward by reason of the fact that the rollers 62 which depend therefrom are disposed within the slots 63 in the transverse plate 64. As the plates 58 and 59 move forward, they are forced to move inward toward one another by reason of the rollers 60 which are secured thereto riding diagonally inward toward one another within the slots 61 formed in the under surface of top plate 42. Consequently, the rollers 62 of the jaw plates also move toward one another in the slots 63 as the entire assembly moves forward.

The double jaws 56 and single jaw 57 carried by their respective plates 58 and 59, necessarily while moving toward the right as shown in FIG. 3 also move inward toward one another until their further movement is restrained by engagement with the cylindrical object being clamped. Release of the material held in the jaws is of course effectuated by pressurizing the pneumatic cylinder in the oppsete direction to retract the piston and thereby cause the jaw carrying plates 58 and 59 to move rearward and apart.

Figure 10:
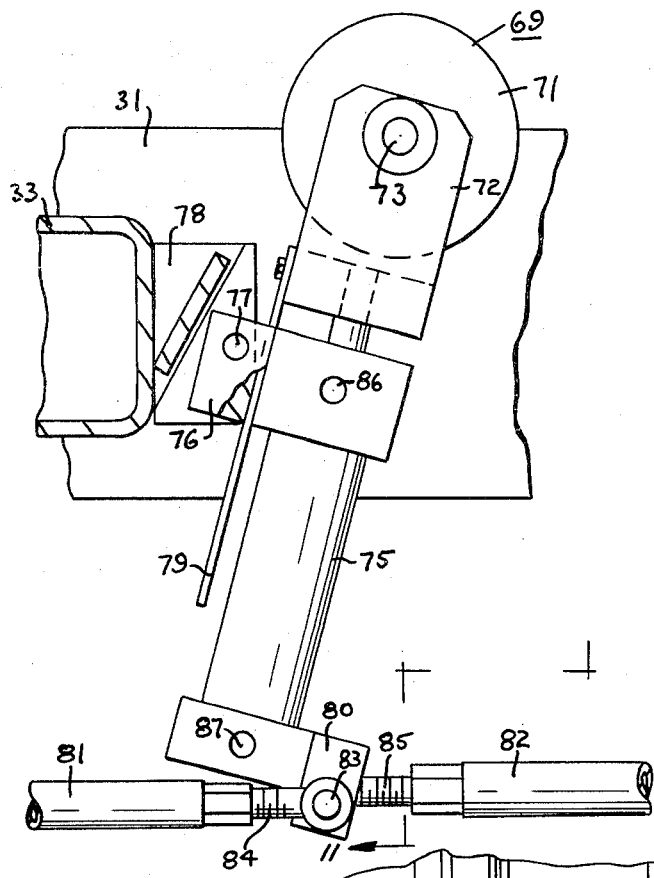
FIG. 10 is a side elevational view of the roller carrier device, on an enlarged scale, shown in the phantom elipse designated as 10 in FIG. 2.
Figure 11:
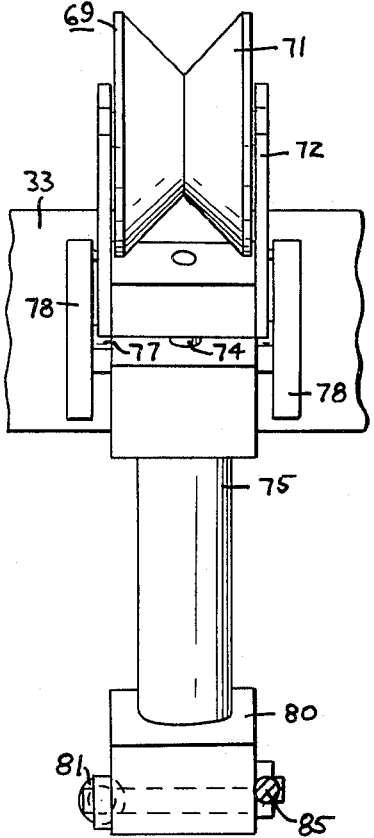
FIG. 11 is a front elevational view of the roller carrier shown in side elevation in FIG. 10.

Since the stock lengths of the cylindrical material being handled are very long compared to their diameters, there would be a substantial amount of bending over the length of the piece if means were not provided for supporting the stock at sufficient intermediate intervals to maintain the stock in a straight line for accurate feeding. This function is carried out by the roller carriers carried by the feed table and designated generally as 69, and by the roller carriers associated with the machining section and designated generally as 70. The roller carriers 69 are shown in more detail in the enlarged showings of FIGS. 10 and 11 to which reference should be now made. Each of the roller carriers 69 includes a support roller 71 in the shape of a pair of joined truncated cones carried in a U-shaped yoke 72 by pivotal support 73. The bottom block of the yoke 72 is secured to the piston rod 74 connected to a piston disposed within a double acting cylinder 75, the cylinder head being fixedly secured to a block 76 which later is pivotally mounted by pin 77 between a pair of pivot support plates 78 which are fixedly secured, as for example by welding, to one of the horizontal transverse tubular supports 33.

Secured to and extending downward from the roller yoke 72 is a vertically ridable guide plate 79 which is reciprocable through a slot in the pivot block 76. The bottom end of the cylinder 75 is secured to a block 80, to which tie rods 81 and 82 are pivotally secured, as at 83 by means of adjustable tie rod ends 84 and 85. Each of the cylinders 75 is provided with an upper port 86 and a lower port 87 by means of which the piston within the cylinder can be made to move respectively downward and upward, the roller in FIGS. 10 and 11 being illustrated in its down position whereas the showings of FIG. 2 illustrate the rollers in solid line in their up position and in dotted line in the down position.

It is required that the support rollers 71 be vertically reciprocable since it is necessary that they be in an up position to support a piece of cylindrical stock which is clamped in the jaws of the feed carriage 38. However, in this up position of the support rollers 71, they occupy a position of physical interference as the feed carriage 38 moves from the left end of the table 30 toward the machining end during operation when pieces of the stock are being successively cut off and machined. Accordingly it is necessary to retract the rollers 71 downward out of the path of the feed carriage 38 as the feed carriage approaches the roller from the left. This is accomplished by use of a toggle switch 88 mounted to the table horizontal supports 31 adjacent to each of the roller carriers 69 as seen in FIGS. 1, 2 and 4.

As best seen in the showing of FIG. 4, the toggle switch 88 is provided with a U-shaped actuator having upstanding arms 89 and 90. The switch arm 89 may be called the roller "down" arm while the arm 90 may be termed the "up" arm because engagement of toggle switch arm 89 by the switch trip roller 91 carried by the feed carriage 38 causes the toggle to assume the position shown in FIG. 4 thereby actuating the control curcuitry shown in FIG. 22 to operate the cylinder 75 and retract the roller 71 downward below the carriage level. Similarly, when the carriage 38 has completed its movement to the right and is being returned to the left end of the table to receive a new piece of long cylindrical stock, as it traverses the table 30 toward the left, the switch trip roller 91 engages the toggle switch arm 90 thus causing the arms to assume the position illustrated in FIG. 2, and thereby again actuating the control circuitry so that the piston moves upward within the cylinder 75 and elevates the conical roller 71 so that the latter is in operative position to support the new piece of stock then to be placed in the feed carriage.

While the double acting cylinders 75 move the conical support rollers 71 upward and downward into supporting and retracted positions, they are not effective for adjusting the location of the supported longitudinal center line of the cylindrical stock carried by the rollers 71. Since the clamping jaws 39 of the feed carriage 38 always place the clamped material with its longitudinal center line at the same elevation, it is necessary to adjust the effective center line support point of the roller carriers 69 in order to maintain the feed stock straight and horizontal. This center line adjustment is effected by means of the tie rods connected to the bottom blocks 80 of the double acting cylinders 75.

Figure 12:
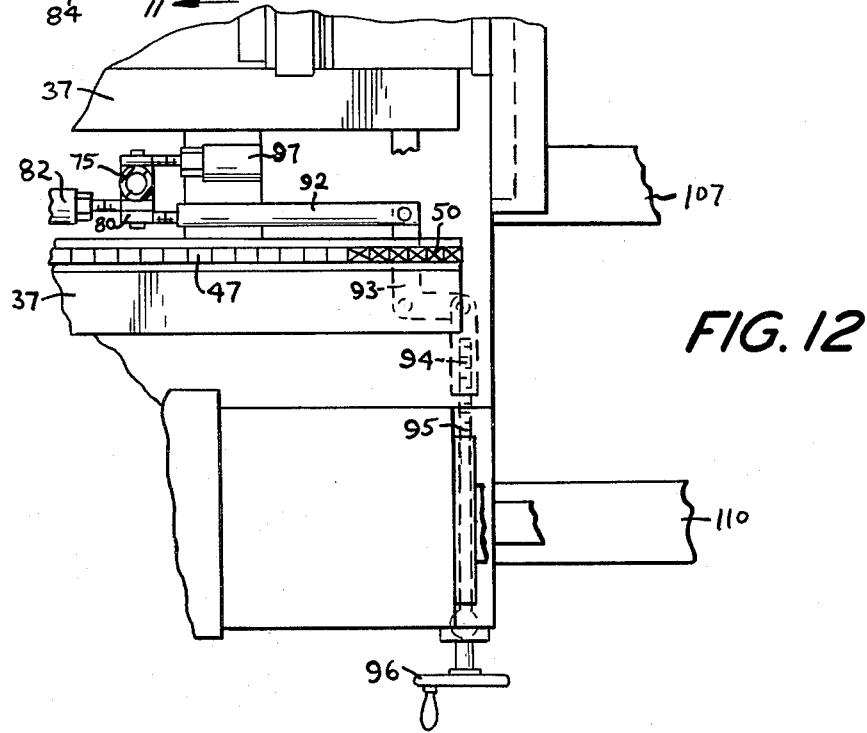
FIG. 12 is an enlarged fragmentary view of the roller carrier centering adjustment mechanism shown in smaller detail in the phantom elipse designated as 12 in FIG. 1.

Referring to FIGS. 1, 2 and 12 it is observed that the tie rod 82 is connected to another tie rod 92 at the bottom block 80 of the double acting cylinder 75 closest to the machining section of the apparatus. The tie rod 92 is pivotally connected to a bell crank 93 which is in turn pivotally connected to a threaded socket member 94 into which is threadedly engaged a rod 95 having affixed at its outer end a vertical centering control wheel 96. As the control wheel 96 is rotated clockwise, the tie rod 92 is moved to the right thereby drawing also to the right the tie rods 82 and 81. This causes the bottom ends of all of the double acting cylinders 75 to also move toward the right pivoting about their pivot pins 77 and thereby raising the conical rollers 71 to elevate the center location of the longitudinal axis of the supported cylindrical stock. Similarly, for cylindrical stock of larger diamerer, which therefore would require the lowering of the support surface of the conical rollers 71, the control wheel 96 is rotated counter clockwise to thereby shift all of the tie rods toward the left and pivot the double acting cylinders to lower the rollers 71. Individual adjustment of the elevational level of each cylinder 75 with respect to the other cylinders is carried out by rotating adjustment of the adjustable tie rod ends such as 84 and 85.

Figure 13:
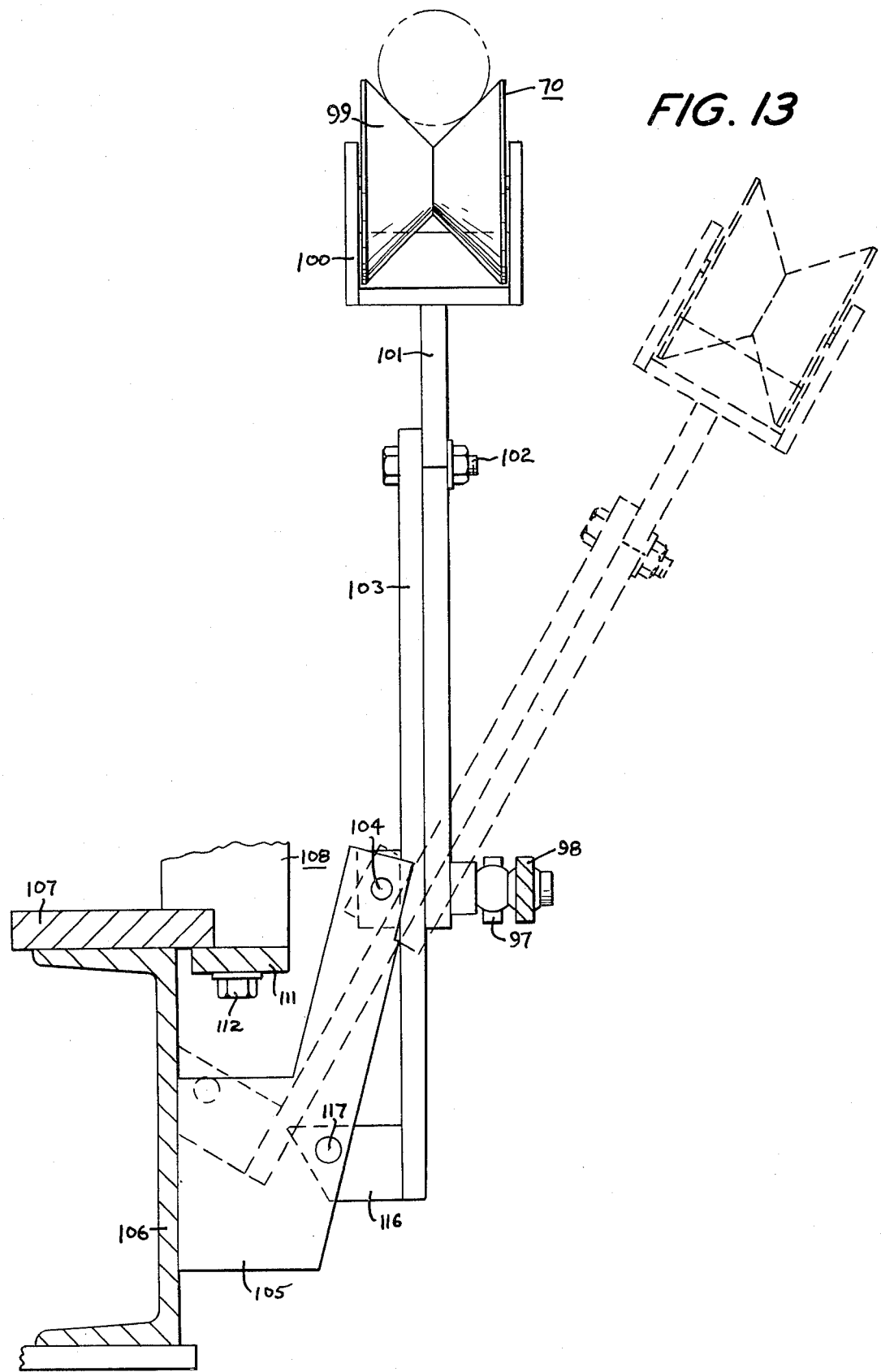
FIG. 13 is a showing on an enlarged scale of the roller carrier device associated with the machining section which supports the cut-off work piece until the latter is secured by the machining section turret mechanism, as would be seen when viewed along the line 13—13 of FIG. 2.
Figure 18:
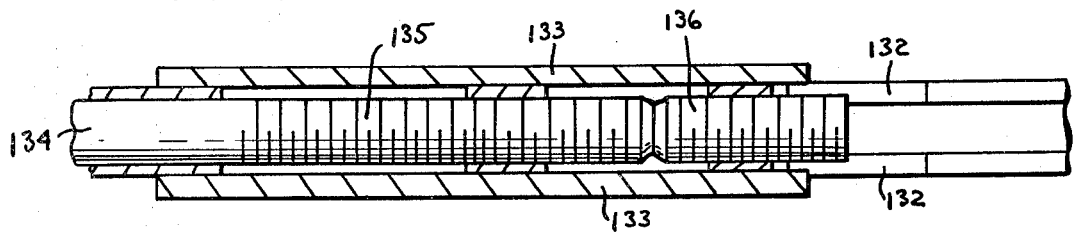
FIG. 18 is an enlarged fragmentary showing of the double screw clamping jaw actuating mechanism of the clamping mechanism of FIG. 15 as seen within the phantom elipse designated as 18 in FIG. 16.

The roller carriers 70 in the machining section are simultaneously controlled by the same centering system by means of tie rods 97 and 98, tie rod 97 being pivotally connected to the bottom block 80 to which tie rods 82 and 92 are also connected, as best seen in the showing of FIG. 12. As best seen in FIG. 13, the roller carriers 70 again include a conical roller 99 rollably mounted in a yoke 100 which is fixedly secured to the upper end of a V-shaped support bar 101 which is itself pivotally connected at 102 to a vertical support bar 103. The vertical bar 103 is pivotally secured at a lower point 104 to a bracket plate 105 which latter is rigidly secured to a channel member 106 upon the upper end of which is fixedly secured one of the trackways 107 along which is ridable the machining carriage designated generally as 108.

Figure 14:
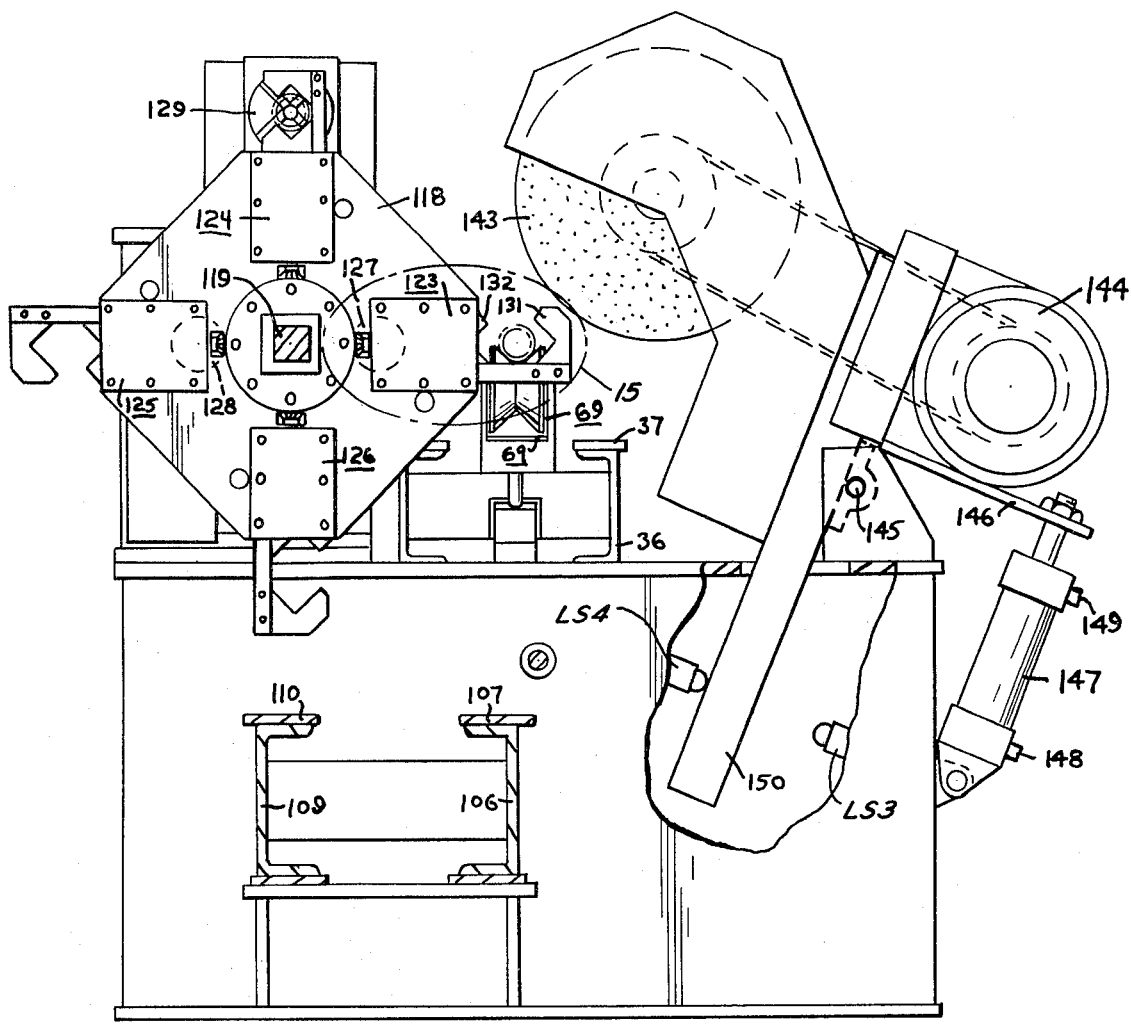
FIG. 14 is an elevational view looking into one interior end of the cut-off and turret mechanism as would be seen when viewed along the line 14—14 of FIG. 2.

As seen in FIG. 14, a second channel member 109 faces the channel 106 and has secured upon its upper surface a second machine trackway 110. As shown in FIG. 13, the machine carriage 108 which rides on the trackways 107 and 110 is provided at its lower outer edges with locking blocks 111 which underlie the outer edges of the trackways and may be drawn up to lock the machining carriage 108 at a desired point along the trackway by means of the draw-up bolts 112. As best seen in FIG. 2, the machining carriage 108 is shiftable along the trackways 107 and 110 to a desired point as determined by the location of the indicator 113 with respect to the length scale 114 which is provided on the outer face of the channel member 109.

With the machining carriage 108 in the relatively adjusted position illustrated in FIGS. 1 and 2, the roller carriers 70 are in their upright solid line position as shown in FIG. 13. However, when the machining carriage 108 has to be moved to the left toward the longitudinally fixed machining station designated generally as 115, it is apparent from FIG. 1 that the roller carriers 70 occupy a position of physical interference with the carriage 108 and consequently must be displaced. The displacement mechanism is illustrated in FIG. 13 wherein it is observed that the roller carriers 70 are shiftable to a dotted line position which does not interfere with movement of the carriage 108.

The vertical support bar 103 is provided at its bottom end with a plate 116 having a lock pin hole therethrough which alines with a similar hole in the bracket plate 105, and within which is normally disposed a locking pin 117. To displace the roller carrier 70 to its dotted line position, it is only necessary to remove the locking pin 117 to permit the roller carrier 70 assembly to pivot outward about pivot pin 104 under the influence of gravity until the bottom plate 116 engages the side of the channel member 106 to prevent further outward rotation.

As best seen in FIGS. 1, 2 and 14, the fixed position machining station consists of a rotating turret mechanism designated generally as 118 which is rotated in a vertical plane by means of a horizontally extending centrally positioned square cross section drive shaft 119, which, as best seen in FIGS. 1 and 2, extends to the right and through the rotating turret mechanism 120 of the movable machining carriage 108, and terminates at an end bearing 121. The drive shaft 119 is driven in a stepped fashion as will be subsequently described by turret drive hydraulic motor 122. Each of the rotating turret mechanisms 118 and 120 is provided with four clamping mechanisms designated as 123 through 126 which are spaced at ninety degree intervals about the turret mechanisms.

The clamping mechanisms which are in a horizontal plane are actuated for opening and closing of the jaws thereof by means of a pair of air motors associated with each of the rotating turret mechanisms, the air motors however being in fixed position and not rotatable with the turret. As shown in FIGS. 14 through 17, the air motor designated as 127 is the motor which causes a clamping mechanism in the position occupied by clamping mechanism 123 to close around the work supported by roller carrier 69, while the air motors 128 shown in phantom outline in FIG. 14 operate clamping mechanisms which occupy the position shown by clamping mechanism 125 to cause the latter to be opened and thereby release a piece of work which has already been machined. The two clamping mechanisms shown in the positions of 124 and 126 are not actuated in those positions, clamp 124 remaining firmly closed about the work to hold the work while machining is done on the ends of the work by machining heads 129 and 130 best seen in FIGS. 1, 2 and 14. The clamping mechanism in the position of clamp 126 is in its open condition awaiting the next quarter turn of the cycle to place it in position to accept a piece of stock to be worked upon.

Figure 15:
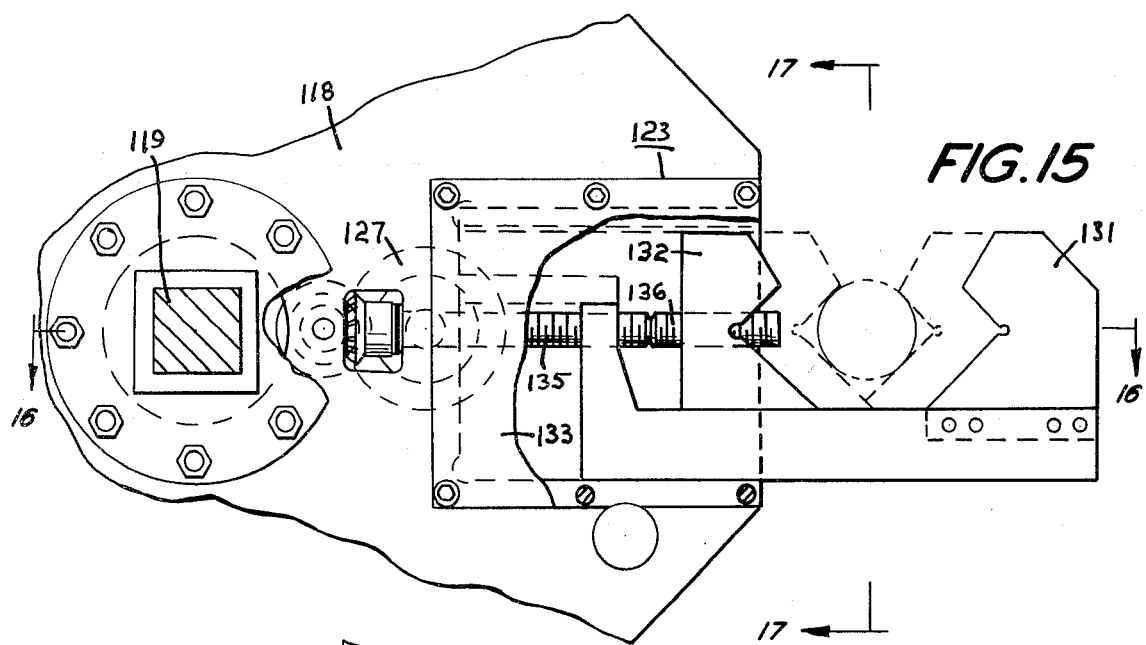
FIG. 15 is an enlarged fragmentary view of the turret clamping mechanism shown within the phantom elipse designated as 15 in FIG. 14.

As best seen in FIGS. 15, 16, 17 and 18, the clamping mechanism consists of an outer jaw 131 and an inner jaw 132 adapted to ride toward and away from one another between the enclosing side plates 133 of the clamping mechanism 123. Extending through the clamping mechanism 123 between the side plates 133 and threadedly engaged with a portion of each of the jaws 131 and 132 is a shaft 134 formed at its right hand end with two threaded portions 135 and 136 whose threads are respectively reversed from one another. As best seen in the showing of FIG. 15, outer jaw 131 is threadedly engaged with the threaded portion 135 while inner jaw 132 is threadedly engaged with the reversely threaded portion 136. Accordingly, rotation of the shaft 134 in one direction will cause the jaws 131 and 132 to be moved toward one another and thereby close upon and clamp the stock which is extending freely through the jaws, whereas rotation of the shaft 134 in the opposite direction will cause the jaws 131 and 132 to move outward away from one another and release the work which had been clamped therein.

The air motor 127 always rotates in the same direction so that every clamping mechanism which successively occupies the clamping position shown in FIG. 14 as occupied by clamping mechanism 123 will always be actuated by air motor 127 in such direction as to cause the clamping jaws 131 and 132 to move toward one another and clamp upon the work. Similarly, air motor 128 always rotates in the same direction and will always cause the jaws of a clamping mechanism which occupies a position shown in FIG. 14 by clamping mechanism 125 to be moved outward away from one another to release the work held in the clamp. Since there are no air motor actuators at the positions shown in FIG. 14 as occupied by clamping mechanisms 124 and 126, clamping mechanisms in such positions are not actuated at all but remain in the condition of previous actuation. The rotation of the turret mechanism as viewed in FIG. 14 is counterclockwise so that any given clamping mechanism will successively sequentially occupy the positions shown respectively by clamping mechanisms 123, 124, 125 and 126, and then back to the position of 123.

Figure 16:
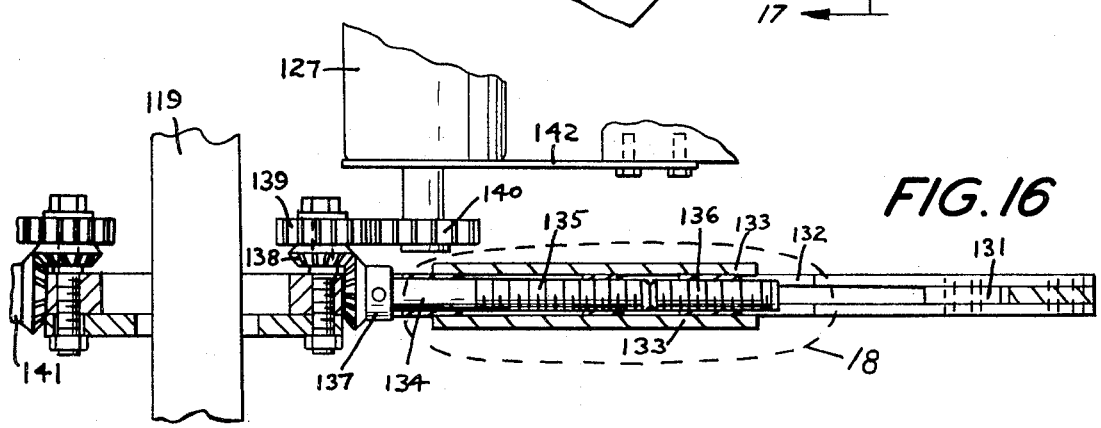
FIG. 16 is a horizontal sectional view through the clamping mechanism portion of the turret mechanism shown in FIG. 15 as would be seen when viewed along the line 16—16 thereof.
Figure 17:
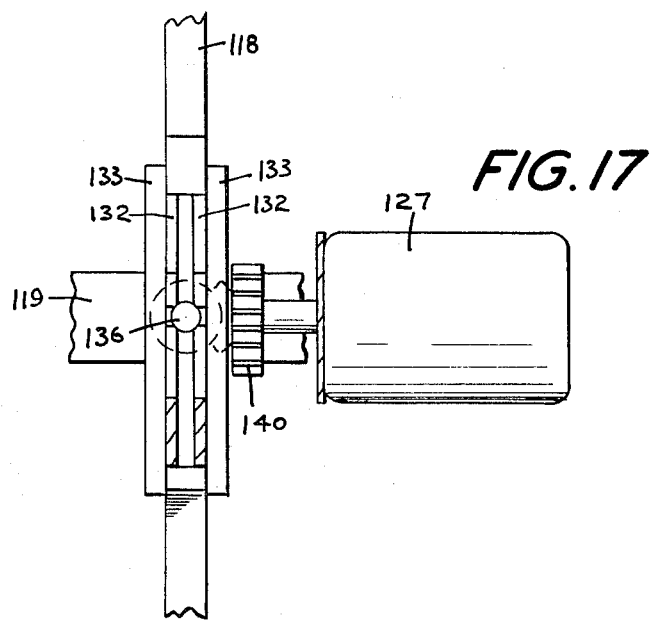
FIG. 17 is a vertical sectional view through the clamping mechanism of FIG. 15 as would be seen when viewed along line 17—17 thereof.

As best seen in FIGS. 15 through 17, the left hand end of shaft 134 has secured thereupon a bevel gear 137 engaged at right angles with another bevel gear 138 which latter is fixed to and mounted upon a common shaft with a pinion gear 139. The pinion gear 139 is engaged with another pinion gear 140 which latter is fastened upon the shaft of air motor 127. A similar arrangement is shown to the left of turret drive shaft 119 terminating in a shaft 141 extending to the left and being identical to shaft 134 to thereby drive the jaws of clamping mechanisms in the position of clamping mechanism 125 shown in FIG. 14, to thereby cause the jaws of such clamping mechanism to be opened. Air motor 127, and similarly the other air motors, is supported in fixed position by a support bracket 142 whereby it will be understood that the air motors are held in a mechanically fixed position and the turret rotates the pinion gear 139 associated with a particular clamping mechanism into and out of engagement with the air motors.

As also seen in FIGS. 1 and 14, a cut-off mechanism is pivotally mounted at the fixed machining station so that the high speed rotary cut-off blade 143 driven by an electric motor 144 is enabled to pivot downward about pivot support 145 when support bracket 146 is driven upward by hydraulic cylinder 147 to thereby cut through the stock held by clamping mechanism 123, the cut-off position being behind the clamping jaws 131 and 132 as viewed in FIG. 14. The downward or cutting stroke of the cut-off blade occurs when the piston of hydraulic cylinder 147 is moved upward by pressurization of the cylinder through lower port 148, while retraction of the cut-off blade after its cutting stroke has been made is achieved by pressurization of the hydraulic cylinder 147 through its upper port 149. Movement of the cut-off mechanism in both the cutting and retraction strokes of the cut-off blade 143 is controlled by certain switches, two of which, limit switches LS3 and LS4 are engaged by depending arm 150 of the cut-off mechanism when the cut-off mechanism respectively hits a forward cutting stop, and when the arm 150 thereafter strikes the return stop for the cut-off mechanism.

Figure 19:
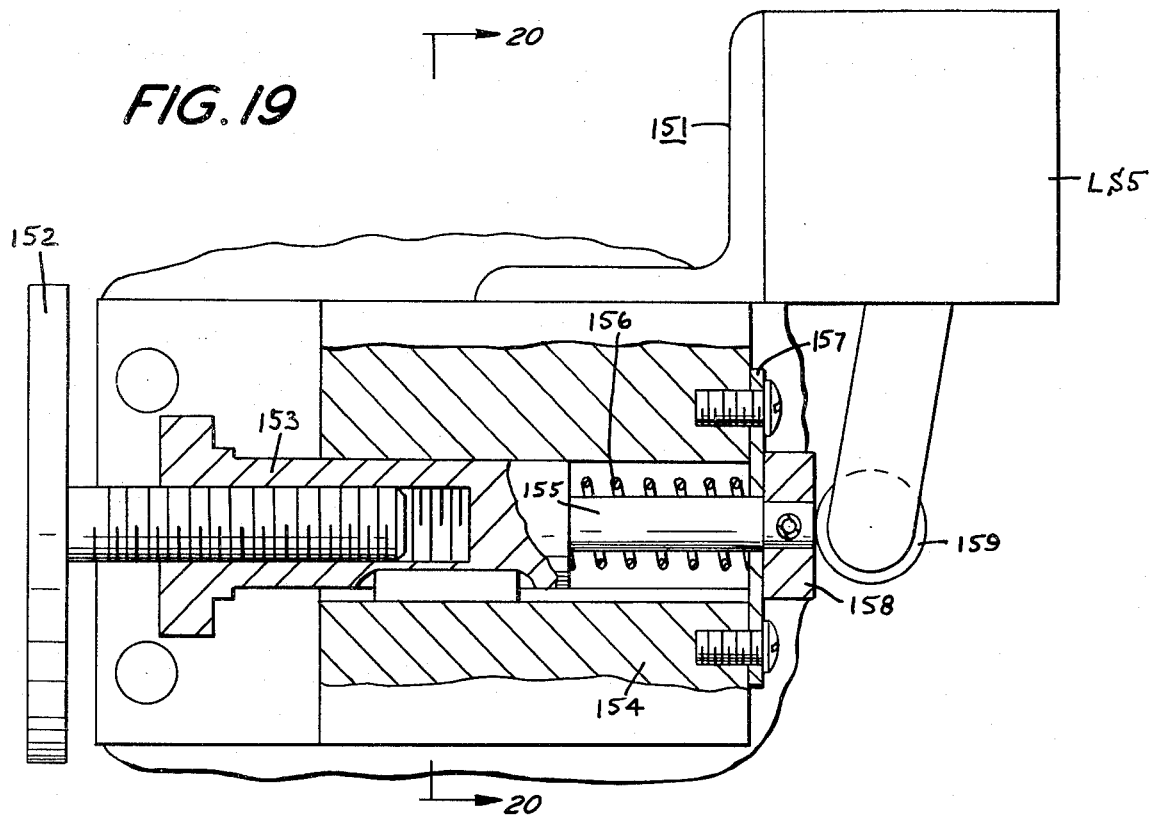
FIG. 19 is an enlarged fragmentary view, partly in section, of the work piece length sensing mechanism which is contained within the phantom circle 19 shown in FIG. 1.
Figure 20:
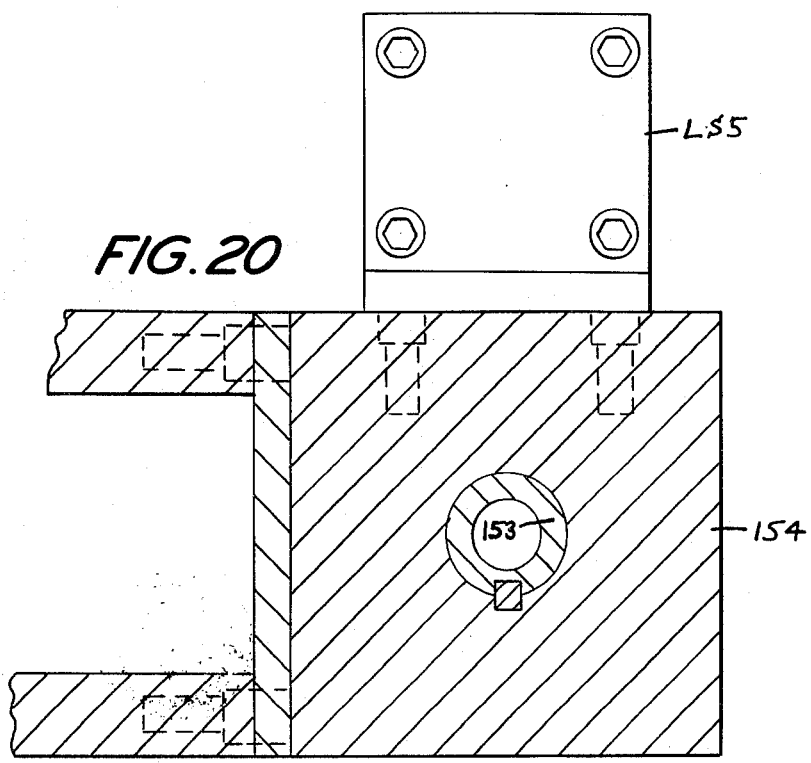
FIG. 20 is a cross sectional view through the sensor shown in FIG. 19

As best seen in FIGS. 1, 19 and 20, a work stop switch mechanism generally designated as 151 is carried by the machining carriage 108 in such a position that the adjustable front pad 152 is engaged endwise by the leading end of the stock which is being fed forward by the feed carriage mechanism 38 over the support rollers 69 and 70. As best seen in FIG. 19, the front pad 152 is axially adjustably threadedly engaged in a sleeve 153 which is keyed for axial movement within a support block 154. The rear end of the sleeve 153 is provided with an axially extending shaft 155 about which is disposed a compression spring 156, the shaft 155 extending through a rear plate 157 and having secured upon its end a retainer ring 158 which prevents the compression spring 156 from expelling the sleeve 153 from support block 154. The retainer ring 158 engages the roller 159 mounted on the actuating arm of a limit switch LS5.

When the front pad 152 of the work stop switch mechanism 151 is struck by the advancing end of the work piece, it moves backward against the bias of spring 156 and actuates LS5 which, in a manner to be explained, causes immediate stopping of the feed carriage 38 and initiates the cycle of operation which causes the clamping mechanisms 123 of the machining turrets to close, followed by actuation of the cut-off mechanism to sever the work piece to be machined from the long length of stock being advanced by the feed carriage, causes the turret to rotate and initiate machining of the cut-off piece, and restarts the feed carriage 38 to advance a new length of stock into position for clamping, cutting and subsequent machining.

OPERATION

Figure 21:
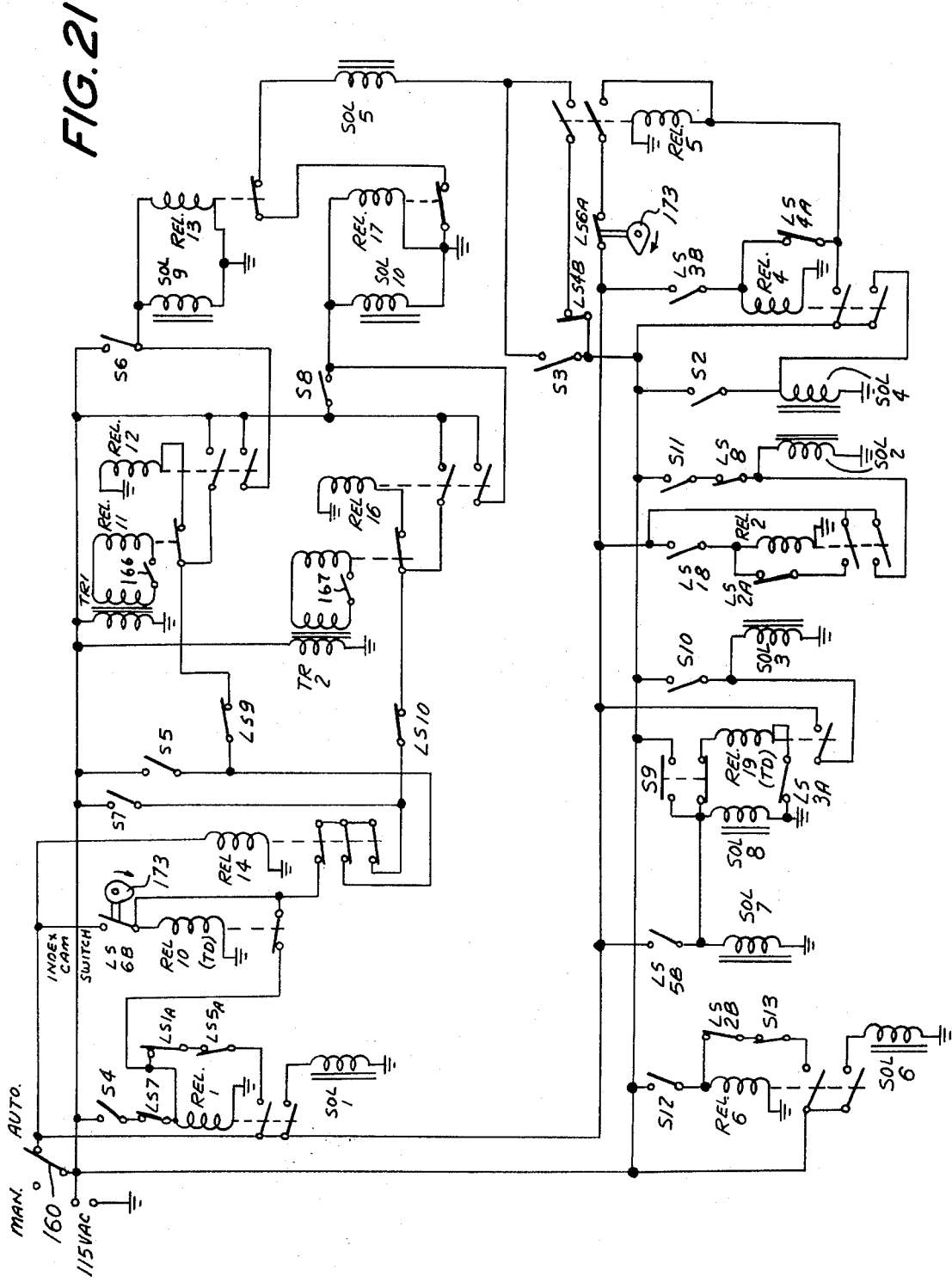
FIG. 21 is a schematic diagram of the electrical control system incorporated in the invention.

Understanding now the basic mechanical and structural arrangement of the apparatus, a more complete understanding of the machine will be had from a consideration of the electrical, pneumatic and hydraulic schematic diagrams of the apparatus as shown in FIGS. 21, 22 and 23 to which attention should now be directed.

Assume that the feed carriage 38 is at the extreme left hand end of the apparatus as shown in FIG. 1, that the roller carriers 69 and 70 are in their up position, that the turrets and cut-off mechanism are in the positions as shown in FIG. 14, and that the power to the apparatus has been turned on and the manual/automatic switch 160 is in the "automatic" position as shown in FIG. 21. Assume now that a piece of rod or tubing is placed in the apparatus resting upon the roller carriers 69 and 70 with its left hand end resting within the feed carriage open clamping jaws 39. With switch 160 in the automatic position, relay 14 is energized and its contacts are accordingly shown as closed. Transformers TR1 and TR2 are energized and the remainder of the circuitry is quiescent.

Manual switch S12 is first momentarily closed to energize Relay 6, causing the double set of relay contacts to be closed to energize Solenoid 6 and establish a holding current circuit for Relay 6 through a manual switch S13 and limit switch LS2B. Energization of Solenoid 6 shifts the pneumatic valve 161 shown in FIG. 22 to cause air from the supply 162 to pressurize pneumatic jaw cylinder 40 and clamp the feed carriage clamping jaws 39 closed about the left hand end of the piece of long work stock.

Next, manual switch S4 is momentarily closed to energize Relay 1 through limit switch LS7 and cause the double contact set of Relay 1 to be closed and thereby energize Solenoid 1 and establish a holding current circuit for Relay 1 through limit switch LS5A and limit switch LS1A. Energization of Solenoid 1 shifts hydraulic valve 163, shown in FIG. 23, to the left and starts the chain drive motor 53 to begin moving the feed carriage 38 to the right so that the right hand end of the long piece of feed stock passes through the open jaws 131 and 132 of turret clamping mechanism 123 and moves toward the right toward ultimate engagement with the front pad 152 which actuates the work stop switch LS5.

When the holding current circuit for Relay 1 was established, current also flowed through this same path through LS5A and LS1A over toward the right through the normally closed switch of time delay Relay 10, upward to one contact of limit switch LS6B and downward through the coil of Relay 10 to energize the latter, also flowing out to the right through the closed contacts of Relay 14 to limit switches LS9 and LS10. The energization of time delay Relay 10 does not cause its switch to open immediately, but a period of time elapses before the relay switch opens as will be subsequently pointed out.

Limit switches LS9 and LS10 are respectively associated with the machining spindles of the machining heads 129 and 130 and are normally closed when the machining spindles are in their retracted position. Accordingly, current flows through these normally closed switches over toward the right and through the normally closed switches of deenergized Relays 11 and 15 to respectively energize the coils of Relays 12 and 16. Energization of Relays 12 and 16 causes them each to close their double set of contacts to establish a holding current circuit for each relay through the upper set of contacts, and to provide an energizing current path from the supply line to energize Solenoids 9 and 10 and Relays 13 and 17. Energization of relays 13 and 17 causes them each to open their associated switch circuit to prevent energization of Solenoid 5 so that rotation of the turret mechanism cannot occur during a machining operation.

The energization of Solenoids 9 and 10 actuates pneumatic valves 164 and 165 to cause the machining spindles of machining heads 129 and 130 to move toward one another and carry out machining operations on both ends of a piece of work stock which is held in the clamping mechanism 124. In a start-up operation there is of course no work piece so held and the the machining spindles extend without encountering a work piece. However, as soon as the machining spindles begin to extend, switches LS9 and LS10 open. As soon as the machining spindles are fully extended at the completion of a machining operation, they close limit switches 166 and 167 which are in series with the coils of Relays 11 and 15. With these switches closed, Relays 11 and 15 are energized and pull open their normally closed switch circuits thereby deenergizing Relays 12 and 16 which drop out and deenergize Solenoids 9 and 10 and Relays 13 and 17. The deenergization of Solenoids 9 and 10 causes pneumatic valves 164 and 165 to return to their conditions as shown in FIG. 22, and thereby causes the machining spindles of machining heads 129 and 130 to retract. Deenergization of Relays 13 and 17 allows their associated switches to close so that the turret drive mechanism is no longer in a locked out condition and can begin to rotate as soon as Solenoid 5 is energized.

In the interim, since the machining operation takes longer than the time necessary to feed the long piece of stock over to the right to encounter and actuate the work stop switch LS5, during the machining operation the end of the work piece has in fact actuated the work stop switch and caused limit switch LS5A to open and limit switch LS5B to close. Since limit switch LS5A has opened, the holding circuit to Relay 1 is broken and the relay contacts have dropped out thereby deenergizing Solenoid 1 and causing the feed carriage 38 to stop. The time delay Relay 10 is needed for the start up operation when there is no stock in position to be machined, because under such conditions the machining spindles will move rapidly out and retract before the feed carriage has completed feeding of the first piece of stock. When the machining spindles retract, the limit switches LS9 and LS10 will again close and start the machining spindles again extending. This cyclic operation could continue until the turrets started to rotate, and under some circumstances the turrets clamping mechanisms could engage and severely damage the machining spindles. Accordingly, the time delay Relay 10, by opening its contacts after a predetermined length of time which is less than that required to complete a normal machining or carriage feed operation, opens the circuit from the power source to Relays 12 and 16 so that when they subsequently drop out under control of the limit switches 166 and 167, they cannot again be energized and the machining spindles remain retracted.

When work stop switch LS5 was actuated and closed limit switch LS5B, Solenoid 7 and Solenoid 8 and time delay Relay 19 were all energized. Energization of Solenoids 7 and 8, as shown in FIG. 22, actuate pneumatic valves 168 and 169 to activate air motors 127 and 128 to respectively close the jaws of clamping mechanism 123 and open the jaws of clamping mechanism 125. Consequently, the forward end of the piece of long stock becomes firmly clamped by the jaws of the turrets 118 and 120 of the stationary and movable machining stations. The time delay of Relay 19 is sufficient so that the jaws of clamping mechanism 123 have completely closed before Relay 19 closes its associated switch to thereby energize Solenoid 3.

Energization of Solenoid 3 as shown in FIG. 23, shifts hydraulic valve 170 to the right and thereby pressurizes the lower port 148 of hydraulic cylinder 147 causing the cut-off blade 143 to move downward and cut through the clamped stock at a point behind the clamp mechanism 123 as previously described. When the cut-off mechanism reaches the limit of its motion, the arm 150 actuates limit switch LS3 to thereby open switch LS3A and close switch LS3B. The opening of limit switch LS3A deenergizes Relay 19 so that its associated relay switch opens and thereby deenergizes Solenoid 3. Simultaneously the closure of switch LS3B energizes Relay 4 and also energizes Relay 5 through closed normally open limit switch LS4A. LS4A closed when the cutting mechanism began its cutting stroke.

Energization of Relay 5 closes its contacts and establishes a holding current circuit for Relay 5 through the lower switch circuit of Relay 5 and index cam normally closed switch LS6A while simultaneously closing the upper switch circuit of Relay 5 which is in series with the turret drive Solenoid, Solenoid 5 and limit switch LS4B. While limit switch LS4B is shown in its closed position, this switch LS4B became opened when Solenoid 3 had been energized to move the cut-off mechanism into cutting position. It remains open until the arm 150 of the cut-off mechanism has moved to the left to actuate limit switch LS4, and this occurs through the energization of Relay 4 as previously mentioned.

When Relay 4 was energized it closed its contacts and energized Solenoid 4 while also establishing a holding circuit for Relay 4 through switch LS4A which closed when the cut-off mechanism started its cutting stroke. Energization of Solenoid 4 actuates hydraulic valve 170 in the opposite direction to pressurize upper port 149 of hydraulic cylinder 147 and cause the cut-off mechanism to go through a retraction stroke. This causes switch LS3A to again close and switch LS3B to open. The opening of the switch LS3B is however immaterial because of the establishment of the holding circuit for Relay 4 through LS4A. Similarly, the reclosing of switch LS3A which again energizes time delay Relay 19 is not material since, as will be seen, limit switch LS5B will open before Relay 19 has time to pull in its switch circuit so that a hunting operation of the cut-off mechanism does not occur. When Solenoid 4 has retracted the cut-off mechanism, limit switch LS4 is actuated to open switch LS4A and close switch LS4B. The opening of switch LS4A deenergizes Relay 4 which drops out and deenergizes Solenoid 4. Relay 5 of course remains in its pulled-in energized state through its holding circuit through index cam operated switch LS6A.

With LS4B now closed, and with Relay 5 contacts pulled in, Solenoid 5 becomes energized and actuates hydraulic valve 171 to start the turret drive motor 122 to cause rotation of the turrets 118 and 120 to carry the piece of cut-off stock held in clamping mechanisms 123 counterclockwise toward the machining head stations. Simultaneously, turret pin-lock mechanisms 172 are pressurized to retract the locking pins and permit the turrets to rotate. As soon as the turrets start to rotate, the end of the cut-off work piece which is engaged with pad 152 of the work stop switch actuator slips off of the pad and permits compression spring 156 to shift the actuator to the left and deactuate the work stop switch LS5. As soon as this occurs, LS5B opens as previously mentioned to deenergize time delay Relay 19 and Solenoids 7 and 8. Similarly limit switch LS5A recloses. The turrets 118 and 120 continue to rotate until they have carried the cut-off piece of stock which is to be machined into position in front of the machining heads 129 and 130.

At this point an indexing cam 173 engages limit switch 6 to momentarily open limit switch LS6A and momentarily close limit switch LS6B. The momentary opening of switch LS6A breaks the holding circuit for Relay 5 and the relay deenergizes opening its switch circuits and deenergizing Solenoid 5 which thereby causes hydraulic valve 171 to deactuate and stop the turret drive motor 122 while allowing the turret pin lock mechanisms 172 to engage and hold the turrets 118 and 120 in properly indexed position for machining to take place. The momentary closing of switch LS6B provides a current path from the power line through the now closed switch circuit of time delay Relay 10 back to Relay 1 to energize the latter and cause it to pull in its contacts to thereby again energize Solenoid 1 and establish a holding current circuit for Relay 1 through LS5A and LS1A. Energization of Solenoid 1 of course again starts the feed carriage 38 forward to feed a new piece of material toward the work stop switch LS5 and again start the operation of the machining head circuits as previously described.

The foregoing sequence of operations continues repetitively with the long piece of feed stock being successively fed in and cut off into the desired lengths, with the cut off pieces being thereafter rotated into machining position, being machined and then being rotated into discharge position and discharged. There of course comes a time when the initial long length of feed stock is no longer long enough to reach the work stop switch LS5. When this occurs, the feed carriage 38 in its forward movement engages and actuates limit switch LS7 and limit switch LS1.

Engagement of the feed carriage with limit switch LS7 opens the latter so that manual actuation of the "start feed" switch S4 is inoperative to cause the feed carriage to move forward, while actuation of switch LS1 opens limit switch LS1A and closes limit switch LS1B. The opening of limit switch LS1A prevents a holding current circuit for Relay 1 from being established if the conditions were such that switch LS6B were momentarily closed at this time. The closing of limit switch LS1B energizes Relay 2, pulling in its switch contacts and energizing Solenoid 2 while also establishing a holding current circuit for Relay 2 through limit switch LS2A. Energization of Solenoid 2, as seen from FIG. 23, shifts hydraulic valve 163 to the left to thereby counter-rotate chain drive work feed carriage motor 53 and cause the feed carriage 38 to be retracted backwards toward the initial loading station.

Upon movement of the feed carriage 38 backward toward the loading station, limit switch LS1B of course opens but Relay 2 remains energized due to its holding circuit. When the feed carriage returns to the loading station it engages limit switch 2 and thereby opens switches LS2A and LS2B. The opening of switch LS2A defeats the holding circuit for Relay 2 which thereupon drops out and deenergizes Solenoid 2 to terminate the rearward motion of the feed carriage 38. Opening of switch LS2B opens the holding circuit for Relay 6 which thereupon opens its contacts and deenergizes Solenoid 6, opening the feed carriage work clamp and allowing the scrap piece of stock to be removed from the feed carriage so that a new piece may be inserted.

The apparatus may also be operated in a manual or non-automatic mode. This is accomplished by shifting the pole of manual/automatic selector switch 160 to the left to deenergize the automatic line. This immediately deenergizes Relay 14 so that its switch circuits open and disconnect the actions of the feed carriage from the machining operation. All operations are now carried out individually as follows. The clamping of the stock is still effected in the same way by manually closing switch S12, as is the initiation of motion of the feed carriage by manually closing switch S4. When the feed stock has moved sufficiently to engage the work stop switch LS5, the feed carriage 38 is stopped in the manner previously described by the opening of the switch LS5A. However, at this point nothing further will happen unless it is specifically initiated.

Actuation of the turret clamping mechanisms is effected by the use of switch S9. Energization of Solenoid 3 to actuate the cut-off mechanism is accomplished by the closure of switch S10. Thereafter, retraction of the cut-off mechanism is accomplished by opening switch S10 and closing switch S2 to energize Solenoid 4. When the cut-off mechanism has returned, switch S2 is released and switch S3 is closed to energize Solenoid 5 and cause turret rotation to move the cut-off piece into position to be machined, whereupon switch S3 is released to stop the turret. Operation of the machining spindles without an automatic retraction occurring is carried out by actuation of the switches S6 and S8. If actuation of the machining heads with automatic spindle retraction is desired, the switches S5 and S7 are used.

Having now described my invention in connection with a particularly illustrated embodiment thereof, it will be appreciated that modifications and variations of my invention may now occur from time to time to those persons normally skilled in the art without departing from the essential scope or spirit of the invention, and accordingly it is intended to claim the invention broadly as well as specifically as indicated by the appended claims.

What is claimed as new and useful is:

1. Apparatus for cutting to size and machining the ends of elongated cylindrical stock material, comprising in combination,
   a. stock feeding means for securely holding a long piece of cylindrical stock and effective when actuated for shifting the latter along its cylindrical axis.
   b. stock size sensing means for sensing when the leading section of the long stock piece being axially shifted by said stock feeding means is of a predetermined length,
   c. stock cutting means effective when actuated to sever the leading section of said stock from the remainder of said long piece of cylindrical stock, the said severed leading section constituting a workpiece, d. work-piece end machining means effective when actuated to carry out a desired machining operation on at least one end of said work-piece, e. work-piece transport means effective when actuated to transport said work-piece from said stock cutting means to said machining means and from said machining means to a work-piece discharge station, and f. actuatable control means operatively coupled to all of said feeding means, size sensing means, cutting means, machining means and transport means, said control means including selection means operative when actuated in one mode to cause said apparatus to automatically carry out the sequence of operations comprising, feeding the long piece of stock until the pre-determined length is sensed by said sensing means, terminating the stock feeding, severing the work-piece from the long piece of stock, transporting the work-piece to the said machining means, machining at least one end of said work-piece, transporting the machined work-piece to the discharge station, discharging the work-piece, and repeating the aforesaid sequence of operations until the long piece of stock is exhausted.

2. Apparatus as defined in claim 1 wherein said transport means comprises work-piece holding means effective when actuated in a first way to securely hold the work-piece and effective when actuated in a second way to release the work-piece.

3. Apparatus as defined in claim 1 wherein said work-piece end machining means comprises means for simultaneously machining both ends of said work-piece.

4. Apparatus as defined in claim 1 wherein said control means causes said stock feeding means to be actuated and deactuated to complete the feeding of the next leading section of said long piece of stock during the time interval when said machining means carries out its machining operation.

5. Apparatus as defined in claim 1 wherein said control means causes said stock feeding means and said stock cutting means to be actuated and deactuated to complete the feeding of the next leading section of said long piece of stock and the formation of the next work-piece during the time interval when said machining means carries out its machining operation.

6. Apparatus as defined in claim 1 wherein said control means selection means is operative when actuated in a second mode to disable said automatic sequence of operations, and wherein said control means includes a plurality of further means selectably operable to actuate as desired each of said feeding means, cutting means, machining means and transport means.

7. Apparatus as defined in claim 1 wherein said control means comprises actuatable sensing means operative to sense when the remainder of the long piece of stock carried by said stock feeding means is shorter than the aforesaid pre-determined length sensed by said stock size sensing means, said control means sensing means when actuated being effective to cause said feeding means to release said stock remainder piece and condition said feeding means to receive a new long piece of stock.

8. Apparatus as defined in claim 1 wherein said control means comprises lockout means effective to prevent actuation of said work-piece transport means while said machining means is actuated.

9. Apparatus as defined in claim 1 wherein said stock size sensing means through its operative coupling to said control means terminates stock feeding by said feeding means when said size sensing means senses that the said leading section of the long stock piece is of the aforesaid pre-determined length.

10. Apparatus as defined in claim 1 wherein said stock size sensing means through its operative coupling to said control means, a. terminates stock feeding by said feeding means when said size sensing means senses that the said leading section of the long stock piece is of the aforesaid pre-determined length, and b. prevents said stock feeding means from being again actuated until said transport means has been actuated to begin transport of said work-piece to said machining means.

11. Apparatus as defined in claim 1 wherein said stock feeding means comprises.

a. a rectilinearly reversibly shiftable carriage with actuatable drive means therefor coupled to and actuatable by said control means, said carriage having mounted thereto actuatable clamping means coupled to and actuatable by said control means and operative when actuated to securely hold a long piece of cylindrical stock with the cylindrical axis thereof parallel to the rectilinearly shiftable path of said carriage, and said clamping means operative when deactuated to release the stock held therein, and b. cylindrical stock material support means effective to support said elongated cylindrical stock material along substantially a straight line between said shiftable carriage and said stock size sensing means.

12. Apparatus as defined in claim 1 wherein said stock size sensing means comprises actuatable means engaged by the leading end of the piece of stock as the latter is shifted along its cylindrical axis by said stock feeding means, said actuatable means being operatively coupled to said control means.

13. Apparatus as defined in claim 1 wherein said stock cutting means comprises a high speed rotary cutter which when actuated traverses a reciprocating path which intersects the cylindrical axis of said stock material.

14. Apparatus as defined in claim 1 wherein said transport means comprises work-piece holding means effective when actuated to securely hold the said work-piece, and wherein said control means comprises lockout means which prevent actuation of said stock cutting means until said work-piece holding means have secured said long piece of stock.

15. Apparatus as defined in claim 1 wherein said work-piece end machining means comprises a pair of adjustably spaced apart machining means for simultaneously machining both ends of said work-piece, one of said pair of machining means being located at a fixed machining station and the other of said pair of machining means being carried by a movable machining station which is shiftable toward and away from said fixed machining station, said stock size sensing means being carried by said movable machining station and the cutting line of said stock cutting means being fixedly positioned with respect to said fixed machining station.

16. Apparatus as defined in claim 15 wherein said transport means comprises work-piece holding means effective when actuated to securely hold the said work-piece, and wherein said control means comprises lockout means which prevent actuation of said stock cutting means until said work-piece holding means have secured said long piece of stock.

17. Apparatus as defined in claim 15 wherein said control means causes said stock feeding means and said stock cutting means to be actuated and deactuated to complete the feeding of the next leading section of said long piece of stock and the formation of the next work-piece during the time interval when said machining means carries out its machining operation.

18. Apparatus as defined in claim 15 wherein said control means comprises actuatable sensing means operative to sense when the remainder of the long piece of stock carried by said stock feeding means is shorter than the aforesaid pre-determined length sensed by said stock size sensing means, said control means sensing means when actuated being effective to cause said feeding means to release said stock remainder piece and condition said feeding means to receive a new long piece of stock.

19. Apparatus as defined in claim 15 wherein said control means comprises lockout means effective to prevent actuation of said work-piece transport means while said machining means is actuated.

20. Apparatus as defined in claim 15 wherein said stock size sensing means through its operative coupling to said control means,
   a. terminates stock feeding by said feeding means when said size sensing means senses that the said leading section of the long stock piece is of the aforesaid pre-determined length, and
   b. prevents said stock feeding means from being again actuated until said transport means has been actuated to begin transport of said work-piece to said machining means.

21. Apparatus as defined in claim 15 wherein said work-piece transport means comprises a pair of rotary turret mechanisms one of which is fixedly positioned with respect to said fixed machining station and one of which is carried by and fixedly positioned with respect to said movable machining station, each said rotary turret mechanism including at least one work-piece holding means effective when actuated in a first way to securely hold said work-piece in fixed position with respect to the associated said machining means and effective when actuated in a second way to release said work-piece.

22. Apparatus as defined in claim 16 wherein said control means causes said stock feeding means and said stock cutting means to be actuated and deactuated to complete the feeding of the next leading section of said long piece of stock and the formation of the next work-piece during the time interval when said machining means carries out its machining operation.

23. Apparatus as defined in claim 17 wherein said stock size sensing means through its operative coupling to said control means,
   a. terminates stock feeding by said feeding means when said size sensing means senses that the said leading section of the long stock piece is of the aforesaid pre-determined length, and
   b. prevents said stock feeding means from being again actuated until said transport means has been actuated to begin transport of said work-piece to said machining means.

24. Apparatus as defined in claim 20 wherein said control means comprises lockout means effective to prevent actuation of said work-piece transport means while said machining means is actuated.

25. Apparatus as defined in claim 21 wherein each said rotary turret mechanism comprises a plurality of work-piece holding means spaced angularly about said turret, said turret being successively rotated and stopped during said automatic sequence under control of said control means to bring successive ones of said work-piece holding means into position to receive and grasp a work-piece, to move the work-piece to the said machining stations for machining and to thereafter move the machined work-piece to the discharge station and discharge the work-piece by actuation of said work-piece holding means in said second way.

26. Apparatus as defined in claim 22 wherein said control means comprises lockout means effective to prevent actuation of said work-piece transport means while said machining means is actuated.

27. Apparatus for cutting to size and machining the ends of elongated cylindrical stock material, comprising in combination,
   a. stock feeding means for securely holding a long piece of cylindrical stock and effective when actuated for shifting the latter along its cylindrical axis,
   b. stock size sensing means for sensing when the leading section of the long stock piece being axially shifted by said stock feeding means is of a pre-determined length,
   c. stock cutting means effective when actuated to sever the leading section of said stock from the remainder of said long piece of cylindrical stock, the said severed leading section constituting a work-piece,
   d. work-piece end machining means effective when actuated to carry out a desired machining operation on at least one end of said work-piece,
   e. work-piece transport means effective when actuated to transport said work-piece from said stock cutting means to said machining means and from said machining means to a work-piece discharge station, and
   f. means operative to automatically initiate and complete successive cycles of the operations sequentially performed by the aforesaid means upon said elongated piece of stock material until the same is exhausted.

28. Apparatus for cutting to size and machining the ends of elongated cylindrical stock material, comprising in combination,
   a. stock feeding means for securely holding a long piece of cylindrical stock and effective when actuated for shifting the latter along its cylindrical axis.
   b. stock size sensing means for sensing when the leading section of the long stock piece being axially shifted by said stock feeding means is of a pre-determined length,
   c. stock cutting means effective when actuated to sever the leading section of said stock from the remainder of said long piece of cylindrical stock, the said severed leading section constituting a work-piece,
   d. work-piece end machining means effective when actuated to carry out a desired machining operation on at least one end of said work-piece, e. work-piece transport means effective when actuated to transport said work-piece from said stock cutting means to said machining means and from said machining means to a work-piece discharge station, and f. control means selectably operable to actuate as desired each of said feeding means, cutting means, machining means and transport means.

* * * * *